United States Patent [19]
Mohan et al.

[11] Patent Number: 5,455,946
[45] Date of Patent: Oct. 3, 1995

[54] METHOD AND MEANS FOR ARCHIVING MODIFIABLE PAGES IN A LOG BASED TRANSACTION MANAGEMENT SYSTEM

[75] Inventors: Chandrasekaran Mohan, San Jose; Inderpal S. Narang, Saratoga, both of Calif.

[73] Assignee: International Business Machines Corporation, Armonk, N.Y.

[21] Appl. No.: 66,360

[22] Filed: May 21, 1993

[51] Int. Cl.$^6$ .............................. G06F 11/22; G06F 15/00
[52] U.S. Cl. .................... 395/600; 395/488; 395/182.18; 364/DIG. 1; 364/282.1; 364/285.3
[58] Field of Search ..................................... 395/600, 575; 364/DIG. 1, DIG. 2

[56] References Cited

U.S. PATENT DOCUMENTS

| | | | |
|---|---|---|---|
| 4,077,059 | 2/1979 | Cordi et al. | 364/200 |
| 4,507,751 | 3/1985 | Gawlick et al. | 364/DIG. 2 |
| 5,043,866 | 8/1991 | Myre, Jr. et al. | 364/DIG. 1 |
| 5,170,480 | 12/1992 | Mohan et al. | 395/600 |
| 5,201,044 | 4/1993 | Frey, Jr. et al. | 395/575 |
| 5,278,982 | 1/1994 | Daniels et al. | 395/600 |
| 5,280,611 | 1/1984 | Mohan et al. | 395/600 |
| 5,333,303 | 7/1994 | Mohan | 395/575 |

OTHER PUBLICATIONS

"Incremental Data Base Log Image Copy" R. A. Crus et al IBM TDB vol. 25 No. 7B Dec. 1982.

*Primary Examiner*—Thomas G. Black
*Assistant Examiner*—Jean R. Homere
*Attorney, Agent, or Firm*—R. Bruce Brodie; Paik Saber

[57] ABSTRACT

A method and means for achieving files of modifiable pages in a log based phased commit transaction management system (TMS) in which those pages which have been modified since the last full or incremental backup donot require during the copy operation any modifications to the page itself but merely to a common status page. This is accomplished by management of a pair of global log sequence numbers. Comparison between a first number (ICBU_LSN) and each data page LSN as the page is modified permits the common status page to be updated to correctly reflect the changed status. Subsequent modifications to the same page donot require amendment of the status page. The status page indicia are reset as part of the backup procedure and for ascertaining the page copy set for incremental copying. The ICBU LSN assumes one of two values as a function of the copy operation and another value for processing page modifications after the copy operation. A second number (ICRF_LSN) is used in the restoration of a file after the file has been partially restored by a page merge in page number order from full and incremental copies. In this case, the ICRF_LSN defines the point in the log for redo since the most recent copy was made.

6 Claims, 8 Drawing Sheets

| FILE "A" |
|---|
| HEADER PAGE |
| SPACE MAP PAGE (SMP) |
| D-PAGE 1 |
| D-PAGE 2 |
| D-PAGE 3 |
| D-PAGE 4 |

FILE "A"

PAGES IN FILE "A"

| PAGE # | PAGE_LSN |
|---|---|
| 0 | 0 |

ICBU_LSN=0

| | 1 | | 0 |
|---|---|---|---|

ICB1=0   ICB2=0   ICB3=0   ICB4=0

| A1 | 2 | 0 |
|---|---|---|
| A2 | 3 | 0 |
| A3 | 4 | 0 |
| A4 | 5 | 0 |

| FILE NAME | DATE | TIME | FULL/ INCREM. | TAPE ADDRESS FOR FILE COPY | ICRF_LSN |
|---|---|---|---|---|---|
| | | | | | |
| | | | | | |
| | | | | | |

SYSTEM CATALOG

*FIG. 3*

|  | PAGE# 0 | PAGE_LSN 110 |
|---|---|---|
| ICBU_LSN=100 | | |
| | 1 | 0 |
| 0 0 0 0 | | |
| A1 | 2 | 0 |
| A2 | 3 | 0 |
| A3 | 4 | 0 |
| A4 | 5 | 0 |

*FIG. 4*

| FILE NAME | DATE | TIME | FULL/ INCREM. | TAPE ADDRESS FOR FILE COPY | ICRF_LSN |
|---|---|---|---|---|---|
| A | 01592 | 2350 | FULL | T001 | 100 |
|  |  |  |  |  |  |
|  |  |  |  |  |  |

| PAGE# | PAGE_LSN |
|---|---|
| 0 ICBU_LSN=100 | 110 |
| 1  1 0 1 0 | 310 |
| 2  B1 | 215 |
| 3  A2 | 0 |
| 4  C3 | 326 |
| 5  A4 | 0 |

| FILE NAME | DATE | TIME | FULL/ INCREM. | TAPE ADDRESS FOR FILE COPY | ICRF_LSN |
|---|---|---|---|---|---|
| A | 010592 | 2350 | FIC | T001 | 100 |
| A | 010692 | 2200 | IIC | T002 | 463 |
|  |  |  |  |  |  |

| PAGE# | PAGE_LSN | |
|---|---|---|
| 0 | 000 | |
| ICBU_LSN=000 | | HEADER |
| 1 | 000 | |
| 0 0 0 0 | | SMP |
| 2 | 000 | |
| A1 | | D-PAGE 1 |
| 3 | 000 | |
| A2 | | D-PAGE 2 |
| 4 | 000 | |
| A3 | | D-PAGE 3 |
| 5 | 000 | |
| A4 | | D-PAGE 4 |

FIG. 9b

| PAGE# | PAGE_LSN | |
|---|---|---|
| 0 | 110 | |
| ICBU_LSN=100 | | HEADER |
| 1 | 465 | |
| 0 0 0 0 | | SMP |
| 2 | 215 | |
| B1 | | D-PAGE 1 |
| 4 | 326 | |
| C3 | | D-PAGE 3 |

FIG. 10a

| PAGE# | PAGE_LSN | |
|---|---|---|
| 0 | 110 | |
| ICBU_LSN=000 | | HEADER |
| 1 | 465 | |
| 0 0 0 0 | | SMP |
| 2 | 215 | |
| B1 | | D-PAGE 1 |
| 3 | 000 | |
| A2 | | D-PAGE 2 |
| 4 | 326 | |
| C3 | | D-PAGE 3 |
| 5 | 000 | |
| A4 | | D-PAGE 4 |

FIG. 10b

| PAGE# | PAGE_LSN | |
|---|---|---|
| 0 | 530 | |
| ICBU_LSN=000 | | HEADER |
| 1 | 490 | |
| 1 0 0 0 | | SMP |
| 2 | 504 | |
| C1 | | D-PAGE 1 |
| 3 | 000 | |
| A2 | | D-PAGE 2 |
| 4 | 326 | |
| C3 | | D-PAGE 3 |
| 5 | 000 | |
| A4 | | D-PAGE 4 |

| PAGE# 0 | PAGE_LSN 530 |
|---|---|
| ICBU_LSN=519 | HEADER |
| 1 | 490 |
| 1 0 0 0 | SMP |
| 2 | 504 |
| C1 | D-PAGE 1 |
| 3 | 000 |
| A2 | D-PAGE 2 |
| 4 | 326 |
| C3 | D-PAGE 3 |
| 5 | 000 |
| A4 | D-PAGE 4 |

*FIG. 11a*

| PAGE# 0 | PAGE_LSN 530 |
|---|---|
| ICBU_LSN=519 | HEADER |
| 1 | 570 |
| 1 0 0 1 | SMP |
| 2 | 630 |
| D1 | D-PAGE 1 |
| 3 | 000 |
| A2 | D-PAGE 2 |
| 4 | 326 |
| C3 | D-PAGE 3 |
| 5 | 620 |
| B4 | D-PAGE 4 |

*FIG. 11b*

METHOD AND MEANS FOR ARCHIVING MODIFIABLE PAGES IN A LOG BASED TRANSACTION MANAGEMENT SYSTEM

FIELD OF THE INVENTION

This invention relates to data preservation in an information handling system by full or incremental backup copying, where copying is non-disruptive of executing applications. More particularly, this invention relates to a method and means for archiving files of modifiable pages in a log based phased commit transaction management system (TMS).

DESCRIPTION OF RELATED ART

The following discussion is directed to aspects of multiple phase log based transaction management systems and archiving modified data pages in such systems.

Aspects of Transaction Management Systems

A TMS typically includes a CPU, an external DASD subsystem storing a database of modifiable pages, and means for accessing and transferring pages between the store and the CPU. Applications executing on the CPU interact with the pages by way of "transactions". In this regard, a "transaction" is defined to be a logical unit of work comprising a sequence of operations that transforms a consistent state of a recoverable resource (pages) into another consistent state without necessarily preserving consistency at all intermediate points. That is, a transaction is a bounded series of operations changing selected pages in the database from one state to another atomically. Thus, each transaction must be either completed or aborted with no intermediate states permitted.

In a log based TMS, all changes to the pages are written to the log in the form of REDO and UNDO records. The physical log can be a reserved portion of DASD or a tape subsystem or the like. Now, REDO/UNDO records themselves are written to the log before writing any of the changed or modified pages back to their DASD storage locations. This is termed write ahead logging. These change records are used to either recreate or REDO a transaction that has progressed to a point of completion or roll back or UNDO a transaction that has failed to progress to that point.

A TMS is characterized by the fact each transaction is bounded by a BEGIN primitive, and either a COMMIT, or an ABORT and an END primitive i.e. the transaction being of the form "BEGIN ops, ops, .. , ops COMMIT/ABORT .. END".

In a system capable of multi-tasking or the like, transactions overlap in time and completion such that some transactions would have just initiated, others would be "inflight", others either committed or aborted, while still others ended in the recent past. This means that a phased commit system guarantees that if a transaction executes some updates against selected pages in a database, and a failure occurs before the transaction reaches its normal termination (END) or an interim point of consistency (COMMIT/ABORT), then those updates will be UNDOne. Otherwise, the transactions that have reached a normal termination (END) or an interim point of consistency (COMMIT/ABORT) will be REDOne (in the period including COMMIT/ABORT but just prior to END).

To achieve the recovery actions, information synchronism must be provided between modified pages and the counterpart log records. Such is achieved by inclusion of a unique ascending log sequence number (LSN) in each modified page and a page number in the REDO/UNDO record written to the log. Thus, the modified pages index its change record position in the log and the log records index the pages modified.

Particular implementation of these aspects may be found in Myre et al, U.S. Pat. 5,043,866, issued Aug. 27, 1991, and Gawlick et al, U.S. Pat. 4,507,751, issued Mar. 26, 1985.

Myre teaches that if a pair of log sequence numbers defining the extent of the log which has to be used during forward/backward recovery in a TMS are periodically determined and stored in a log as checkpoint information, then upon recovery, the checkpoint may be retrieved and a functional comparison between the components thereof employed in the recovery algorithm avoiding thereby an analysis pass of the log.

Gawlick discloses the journaling (logging) of data stored in a volatile memory or buffer which is accommodated by writing out the buffer contents to a second log upon the occurrence of synchronization points (BEGIN, COMMIT, ABORT). If a fault occurs, a prior state of the buffer is reestablished by rollback (REDO/UNDO) processing of the second log, otherwise, the first log is used.

Archiving

In the art, archiving refers to the systematic storage management practice of copying pages for redundancy and security purposes in a portion of a system irregularly accessed for current information. Archiving or backup copying is done either fully or incrementally and either on a scheduled or opportunistic basis over time. Obviously, incremental copying consumes less resource than does full copying.

Crus et al, "Incremental Database Log Image Copy", Volume 25 IBM Technical Disclosure Bulletin, pages 3730–3732, published Dec. 1982, discloses a method for incremental copying of modified pages in a database by scanning a common status construct denominated as a space map page (SMP) and copying only those data pages having a status bit indicative (termed an incremental status change bit or ICB) of the page(s) having been changed since the last copy operation. More particularly, when a data page is first modified since a copy operation, an ICB is set both in the data and space map pages. If a data page has been modified and its ICB has already been set (indicative of previous modification since the last copy operation), then nothing is done to modify the SMP ICB. The reason an ICB bit is placed on the page is that it reduces the overhead of visiting the SMP on every update of a data page. For copying purposes, the SMP is scanned, each page whose ICB has been set is copied, and the ICB counterparts on both the data page and the SMP are then reset.

In the IBM relational database system DB2, the writing of the modified page to disk is performed immediately after resetting the ICB bit to effectuate an "immediate cormit". This is a significant overhead cost since this is performed for each page individually instead of batching of the DASD write operations.

SUMMARY OF THE INVENTION

It is accordingly an object of this invention to devise a method and means for reducing the overhead associated with incrementally copying modified pages in a database of a log based phased commit TMS.

It is a related object of this invention to devise a method and means for archiving a database of modifiable pages in a log based phased commit TMS which is non-disruptive of executing applications.

It is yet another object of this invention to devise a method and means operable with multiple log based phased commit transaction management systems sharing access to a database of modifiable pages.

The invention utilizes constructs available as part of a log based phased commit TMS. These include a space map page (SMP) and page update status bit (ICB), a header page, a database control block (DBCB), the log, two types of LSN's (ICBU_LSN; ICRF_LSN), and a system catalog. The SMP includes an ICB for each data page, the header page stores the ICBU_LSN for the database, the DBCB maintains the ICBU_LSN in virtual storage, the system catalog stores the ICRF_LSN for the database.

Each SMP tracks allocation status for plural data pages including a status bit (ICB) indicative as to whether the ith page has been updated since the last copy operation. The ICB is set at the first time a page is updated after a copy operation was run and reset at the time the page is copied by said operation. The "header page" is a control or management construct of a database.

The DBCB is created and maintained in virtual storage at the time a database is opened. It is the principal control construct reflecting the current state of the database and is included as part of the initializing step in the method of the invention. It is also the repository for one of the two LSN's (ICBU_LSN). The first LSN is denominated as the "copy bit update LSN" (ICBU_LSN). The second is the "copy roll forward LSN" (ICRF_LSN).

The value of the ICBU_LSN determines whether the ICB for any given data page in the SMP needs to be set. The initial value of ICBU_LSN is set to the LSN of the current end of log after the database is initially loaded into the DASD storage.

The ICRF_LSN denotes the LSN from which the log would have to be scanned to identify log records which must be REDOne (REDO ops) to recover the database after reloading the latest full copy and subsequent incremental copies.

The method and means of this invention which satisfy the foregoing objects rely upon a two phased use of the ICBU_LSN.

In the first phase, the ICBU_LSN is set to a maximum and both the copy roll forward LSN (ICRF_LSN) and the copy set of pages are ascertained by examining the ICB's in the SMP. For incremental copying, the copy set is the set of pages whose ICB's have been changed to indicate that they have been modified since the last copy operation.

The second phase requires that the ICBU_LSN be set to the current end of log LSN and be recorded in the header page after copying the pages in the copyset. For copying, the page is serialized for a short duration which permits page modification and logging concurrently with the execution of the copy operation.

DESCRIPTION OF THE PREFERRED EMBODIMENT

A CPU Environment for Executing the Method of the Invention

The invention can be conveniently practiced in a configuration in which each CPU in the system is an IBM/360 or 370 architected CPU type having an IBMES operating system. An IBM/360 architected CPU is fully described in Amdahl et al, U.S. Pat. No. 3,400,371, "Data Processing System", issued on Sep. 3, 1968. A configuration involving CPU's sharing access to external storage is set forth in Luiz et al, U.S. Pat. No. 4,207,609, "Path Independent Device Reservation and Reconnection in a Multi-CPU and Shared Device Access System", issued Jun. 10, 1980.

An MVS operating system is also set out in IBM publication GC28-1150, "MVS/Extended Architecture System Programming Library: System Macros and Facilities" Volume 1 Details of standard MVS or other operating system services such as local lock management, sub-system invocation by interrupt or monitor, and the posting and waiting of tasks is omitted. These OS services are believed well appreciated by those skilled in the art.

Implementation Aspects of the Invention and Transaction Management Systems

In order to appreciate the operation of the embodiment of this invention, it should be recalled that a TMS is expressed as an application executing under a given operating system. In this case, the application would illustratively be that of a relational database system of the DB2 type as set out in the Baker et al, U.S. Pat. No. 4,498,145, "Method for Assuring Atomicity of Multi-row Update Operations in a Database System", issued Feb. 5, 1985.

An operating system, among its other tasks organizes memory including internal and external storage as a resource. From the view of an application, memory and storage are virtual and backed by a real demand paging LRU hierarchical form of storage.

Figure 1:
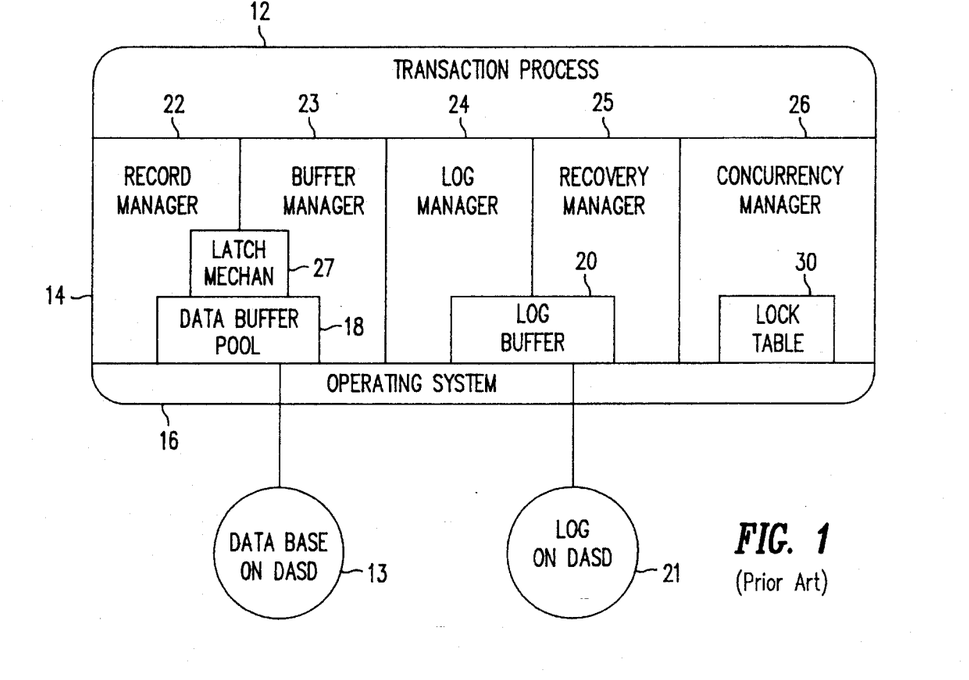
FIG. 1 depicts the logical organization of a log based TMS according to the prior art.

Referring now to FIG. 1, there is shown a TMS in the form of a database system. A transaction process 12 may be an application program whose execution supports the concurrent, overlapping execution of a plurality of transactions.

The transactions executed by the process 12 are provided with access to a database 13 through a database management system program 14 (DBMS) and an operating system 16 providing input/output (I/O) services. A data buffer pool 18 is allocated to the DBMS 14 from CPU main memory for data with respect to database 13 which may be stored on DASD. The DBMS 14 is also allocated a log buffer 20 from main memory for storage of log records destined for system log 21.

DBMS 14 includes a record manager 22, a buffer manager 23, a log manager 24, a recovery manager 25, and a concurrency manager 26.

Manger 22 regulates the data structures and storage space of database 13. It provides record level access to transactions and page level access to system utilities such as loading, copying, or recovering a database. The buffer manager moves pages between the database 13 and the buffer pool 18. The latch manager provides short term serialization (shared/exclusive) to pages being read or modified in the buffer pool 18. The log manager 24 generates the log records, assembling them in numbered sequences in log buffer 20, and writing them to log 21. The recovery manager 25 utilizes the log records to return the database to support transaction level recovery while the concurrency manager 26 implements locks via lock table 30.

Figure 2:
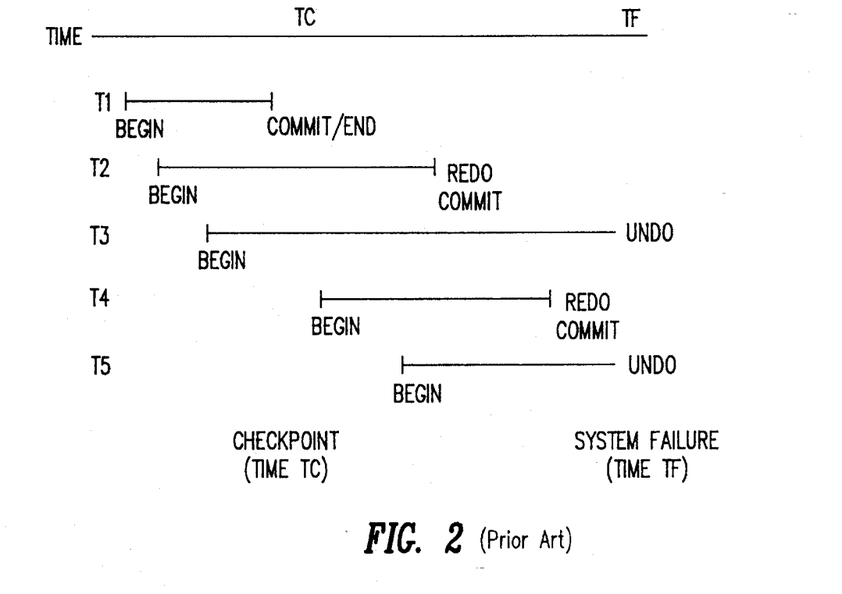
FIG. 2 sets out the relationship among concurrent transaction with respect to REDO and UNDO and the occurrence of failure in a log based phased commit transaction management system according to the prior art.

Referring now to FIG. 2, there is shown the time of occurrence relations among transaction primitives with reference to checkpoints and system failure. At the occurrence of failure and hence restart, the recovery manager must obtain the address of the most recent checkpoint record from a restart file or its equivalent, locate the checkpoint record in the system log, and proceed to search forward through the log from that point to the end. As a result of this process, the Recovery manager is able to determine both the transactions that need to be UNDOne (UNDO) and the transactions that need to be REDOne (REDO) in order to restore the resources to a consistent state.

Each transaction is categorized as being in one of five classes. Thus, transactions of type T1 were completed before checkpoint time Tc. Transactions of T2 started prior to time Tc and were completed after time Tc but before the system failure time Tf. Transactions of type T3 also started before time Tc but did not complete before time Tf. Transactions of type T4 started after time Tc but were completed before time Tf. Finally, transactions of type T5 started after time Tc but did not complete by time Tf. Assuming that at checkpoint time all modified pages were written to DASD, transactions T2 and T4 are subject to REDO, while transactions T3 and T5 are subject to UNDO.

The recovery manager starts two lists. The UNDO list initially contains all transactions listed in the checkpoint record, while the REDO list is initially empty. The Recovery manager searches forward through the log, starting from the checkpoint record. If the Recovery manager finds a BEGIN transaction record for a given transaction, it adds that transaction to the UNDO list. Likewise, if the Recovery manager finds a COMMIT record for a given transaction, it moves that transaction from the UNDO list to the REDO list.

The Recovery manager works forward, REDOing all transactions and then backward through the log UNDOing the transactions in the UNDO list.

A Method and Protocol Level Description of the Preferred Embodiment

First, the data structures in the data base and in virtual storage, the logging protocol, and the latching protocol are described. Second, the processing relating to the copy operation, a transaction's update to set the ICB (if required), and the recovery of a data base using the backup copy is set out. Third, the processing involved in the rollback of an copy, in case its execution is interrupted by a failure is explained. Fourth, the manner of usage of the method of the invention is discussed where it is possible to copy the data directly from DASD storage instead of going through the buffer pool associated with a DB2 like system. Lastly, extensions of the method of the inventions to a multisystem transaction processing system with shared DASD storage are described.

Data Base Data Structures

For purposes of this invention, a data base includes data pages and ancillary constructs. In this regard, a file of pages is deemed to be a functional equivalent to a data base. The ancillary constructs include pages in the data base for tracking the allocation status etc. A page containing user data is called a "data page", a system-owned page tracking the allocation and space availability status of data pages is called a "space map page" (SMP), and a system-owned page containing system related information is called a "header page".

As in DB2, a large table can be divided into many partitions each of which is a separate operating system file. Each partition would have a header page, one or more space-map pages and numerous data pages. Archive copies include copies of not only data pages but also those of SMPs and the header page.

An SMP tracks allocation status of several data page's. Also, an SMP contains one ICB for each data page that it covers. The purpose of the ICB is to track whether the corresponding data page has been modified since the last time the copy operation was run.

In the header page, a field called "image_copy_bit_update_LSN" (ICBU_LSN) is maintained. There is only one ICBU_LSN for a file. The purpose of the ICBU_LSN is that by using it, a transaction updating a data page can efficiently determine if the ICB in the SMP for that data page may need to be set. This is desirable because the ICB needs to be set only if it is the first update to a data page since the last copy operation. Accessing the SMP for subsequent updates of a data page must be avoided because of the overheads involved, such as, DASD I/O, locating and fixing the SMP in the buffer pool, latching it, searching for the appropriate ICB, and "unfixing it, just to determine that no change need be performed.

After the data base is initially loaded, a full copy of the data base must be taken before any update to the data base can be permitted. This assumes that loading was done without logging. This is required if media recovery must be possible without the load having to be repeated before media recovery begins. The full copy operation establishes the initial value for the ICBU_LSN as the LSN of the current end of the log after copying the database.

Associated with each archive copy is an copy roll forward LSN (ICRF_LSN). During media recovery, this is the LSN from which the log would have to be scanned to identify log records whose updates might have to be REDOne to recover the data base after reloading the relevant archive copies (the latest full copy and any subsequent incremental copies). ICRF_LSN is remembered in a system catalog along with the information such as the name of the file which contains the archive copy, and whether a full or incremental copy was taken.

Data Structures in Virtual Storage

As long as a data base is in the "open" state, the DB2 like system maintains a "data base control block" (DBCB) for it in virtual storage.

To make the operation of looking up ICBU_LSN efficient by update transactions, the value of ICBU_LSN is copied from the header page into a field in DBCB when a data base is opened. Subsequently, this field is updated only by the incremental copying method and means.

The TMS uses a log for describing its updates for recovery purposes. When a page is updated, the system assigns a system-wide monotonically increasing log sequence number (LSN) to the log record describing the update and records that LSN in the modified page in a field called "page_LSN".

It is assumed that the copying operation runs as a single transaction and writes undo-redo log records whenever it resets ICBs.

Page Latching

The TMS supports page latches to serialize concurrent read and update operations, or multiple concurrent update operations on a single page. A share (S) latch is used by a read operation and an exclusive (X) latch is used by an update operation, with the usual compatibility rules between the S and X modes. A page latch would be used by the copy operation to make a fuzzy copy of a page, i.e., the copied page may have uncommitted data.

Correctness Criteria

The correctness requirement for an incremental copy (IC) is that the current IC must capture the effects of all data page updates which are represented by log records written prior to the current IC's ICRF_LSN point in the log except for those updates whose effects have already been captured in the most recent full copy (FC), or in an IC made subsequent to that FC and prior to the current IC.

The correctness requirement for a FC is that the current FC must capture the effects of all data page updates which are represented by log records written prior to the current FC's ICRF_LSN point in the log.

Notion of Buffer Pool, System Catalog, and I/O

A buffer pool is a portion of addressable main memory reserved for temporary storage of intermediate results, data, or values in a computation or control operation. In the context of this invention, I/O's for the pages are copied into the buffer pool for purposes of being read, modified, or copied elsewhere.

A system catalog is a directory of files with reference to their location. It also may contain status information. As used in this invention, it includes the file name, whether it is a full or incremental copy, date and time, device where stored, and the associated ICRF_LSN.

I/O is a term used to denote incidental activity for accessing pages

Archive Copying In a Single Transaction Management System

In the following paragraphs, a copy operation is functionally described for use in a single TMS environment. In this case, the copy operation brings data base pages into the TMS buffer pool. Then, the copy operation is set out that is to be used when the data is read directly from DASD, i.e., the pages are not brought into the TMS buffer pool. In the next section, the copy operation is discussed which would be used for a TMS in a multisystem shared disks environment.

A Method of Copying Expressed as an Invocable Software Function i.e. The Copy Operation This section is directed to (a) the copy operation, (b) update of a data page by a transaction and, (c) the recovery of the data base after a media failure. The rollback processing in case copy operation's execution is interrupted by a failure is also described.

Archive copying comprises the steps of:

registering the initialization of the copy operation for a given data base in the system catalog to ensure that only one copy operation is running against the same data base at one time.

opening the data base, if it is not already open, and reading the header page of the data base in order to set the value of ICBU_LSN in DBCB.. This would cause DBCB to be created. If the data base was already open, then ICBU_LSN in DBCB would have already been set.

ensuring that all the SMPs of this data base are present in the buffer pool. For those SMPs that aren't already in the buffer pool, of course, this would involve initiating I/Os to bring them into the buffer pool and waiting for those I/Os to complete.

This prefetching of SMPs is an optimization to minimize the time period during which the ICBU_LSN field in DBCB has the maximum possible value (X'F .. FF'—see the next step).

changing the value of ICBU_LSN in DBCB to X'FF..FF' (i.e., the maximum possible value) atomically.

recording the LSN of the current-end-of-log as the ICRF_LSN in the appropriate system catalog and logging that action, these being for use during media recovery.

For each SMP in the data base, initializing as follows:

X latching the SMP.

examining all the ICB's in the SMP and resetting those ICB's that have a value of '1' to '0'. For an IC, the corresponding data pages are the ones that must have been modified since the last copy operation (full or incremental) and would be copied. For a full copying, all data pages would be copied.

writing a REDO/UNDO log record that describes all the ICB's that were reset on this SMP. For an IC, keep a copy of the log record in virtual storage for use later on to know which data pages to copy.

unlatching the SMP.

Note that after the ICRF_LSN value is picked, if new SMPs get added to the data base, they do not have to be examined as part of this copy operation.

For each such ICBi, do the following:

S latching the ith data page.

Copying the ith data page into the archive copy file.

Unlatching the ith data page.

For a FC, all data pages covered by this SMP are copied.

To make these operations very efficient, and to reduce the I/O costs and delays, batched I/Os (i.e., reading more than one page in a single I/O call) and prefetching of desired data pages can be employed Parallelism also can be employed to further reduce the elapsed time for the copy operation.

Related operations include:

getting the current-end-of-log LSN.

updating the ICBU_LSN fields in DBCB and in the header page to the current end of log LSN value.

logging the update to the header page using a REDO-only log record.

Even if the archive copy transaction were to rollback, it would be correct to retain the new ICBU_LSN instead of reverting back to the old ICBU_LSN. This is the reason a REDO-only log record, as opposed to a REDO/UNDO log record is used. Relatedly, this approach avoids some special case handling of UNDO's of header page updates in the shared DASD environment.

For each SMP in the data base do the following:

For an IC, by examining the cached version of the earlier-written log record for that SMP, determine the ICB's that were reset (to '0') by the operation (ICBi relates to ith data page).

At the end of the copy operation (i.e., after all the relevant data pages have been copied), do the following:

Note the completion of this copy operation so that, once this image copy transaction commits, a subsequent invocation of the image copy operation for this data base can begin execution without being delayed.

Commit the copy transaction.

If no concurrent updates are allowed when the copy operation is running, the method would be a subset of that described above. The ICRF_LSN value would be selected after copying all of the required pages. No page latching is needed for the copy operation.

Method/Logic for a Transaction Updating a Page

An update transaction, while updating a data page, has to determine whether the ICB for that data page needs to be set ('1') in the SMP. It does this by comparing the current page_LSN of the page being updated with the ICBU_LSN (prior to making this update). This check determines whether the data page has already been modified since the last execution of the copy operation or this is the first update since that time.

The method/logic followed by an update transaction is:

X latch the data page.

If current page_LSN<ICBU_LSN in DBCB (prior to update) then do the following:

Access SMP which covers this data page and S latch it.

Since soon after the copy operation starts its execution it sets ICBU_LSN to X'FF FF', it causes every update to this data base to visit the relevant SMP while the operation is executing.

If ICB is not already set, then set it and log that action using a REDO-only log record. Multiple transactions could be updating the SMP concurrently since only an S latch is acquired on the SMP. S latching is done to improve concurrency on such hot-spot pages. As a result, updates to the ICB as well as the page_LSN field must be done carefully (e.g., don't update the page_LSN field if it has already been updated to a higher value by another transaction—compare and swap method/logic should be used).

The ICB could be already set in the following case:

Data page was updated one or more times while the copy operation was running with ICBU_LSN in DBCB set to X'FF..FF'.One possible way to avoid visiting the SMP multiple times during such times is to have a flag in the buffer manager's page control block (PCB) for that page which could indicate, while ICBU_LSN is X'FF .... FF', that the data page's ICB has already been set. Copy operation resets that flag while holding the latch on data page. That flag helps only if the data page remains cached from one update to another, i.e., the buffer slot for the page is not stolen.

If the page gets replaced and is cached again, the PCB flag is initialized such that it implies that the ICB has not been set.

The reason for writing the log record as a REDO-only record for the SMP update is that even if the transaction which updated the data page were to rollback, the ICB value must remain set (='1') in the SMP. This is because a subsequent update to the same data page by another transaction would presume that the ICB had been set because the page_LSN would have been set to a value greater than ICBU_LSN by the first update (see below).

Unlatch SMP.

Update DP, log the update and set DP's page_LSN to the LSN of the log record just written.

Unlatch DP.

An Optimization to Reduce the Duration for Which ICBU_LSN Remains Set to MAX

In a TMS such as DB2, which maintains a list of pages currently cached in the buffer pool, it is possible to reduce the duration for which the ICBU_LSN remains at the MAX value. This is accomplished as follows:

After setting the ICBU_LSN to MAX, S latch each page on the list of changed pages.

Set ICBU_LSN to current end of log (non-MAX value).

Copy pages.

This optimization would reduce the duration for which ICBU_LSN is set to MAX because the pages are accessed and copied AFTER setting the ICBU_LSN to a non-MAX value.

Note that if the ICB needs to be set, then it is important that the logging of the corresponding DP's update be done after the ICB is set and the ICB setting operation is logged. The opposite order could cause incorrect media recovery.

For a newly allocated page, ICB is always set ('1').

Failure During The Copy Operation's Execution

In case the copy operation's execution is interrupted due to some failure, the normal rollback method/logic, using the log records as written by the copy operation, will restore the old settings of those ICB's whose settings were modified by the copy operation. It is important that no other ICB's' values be modified by the rollback method to contain their original values (i.e., no ICB's are assigned '0's during rollback). Also, the information in the system catalog about the current execution of copy (e.g., ICRF_LSN value) would be deleted.

Recovery After Media Failure

The method/logic for media recovery requires that the log scan is started from the ICRF_LSN value of the last completed copy operation. This scan is begun after the data is copied from the most recent FC and from all the subsequent IICs in time sequence.

An Illustrative Example

Figure 3:
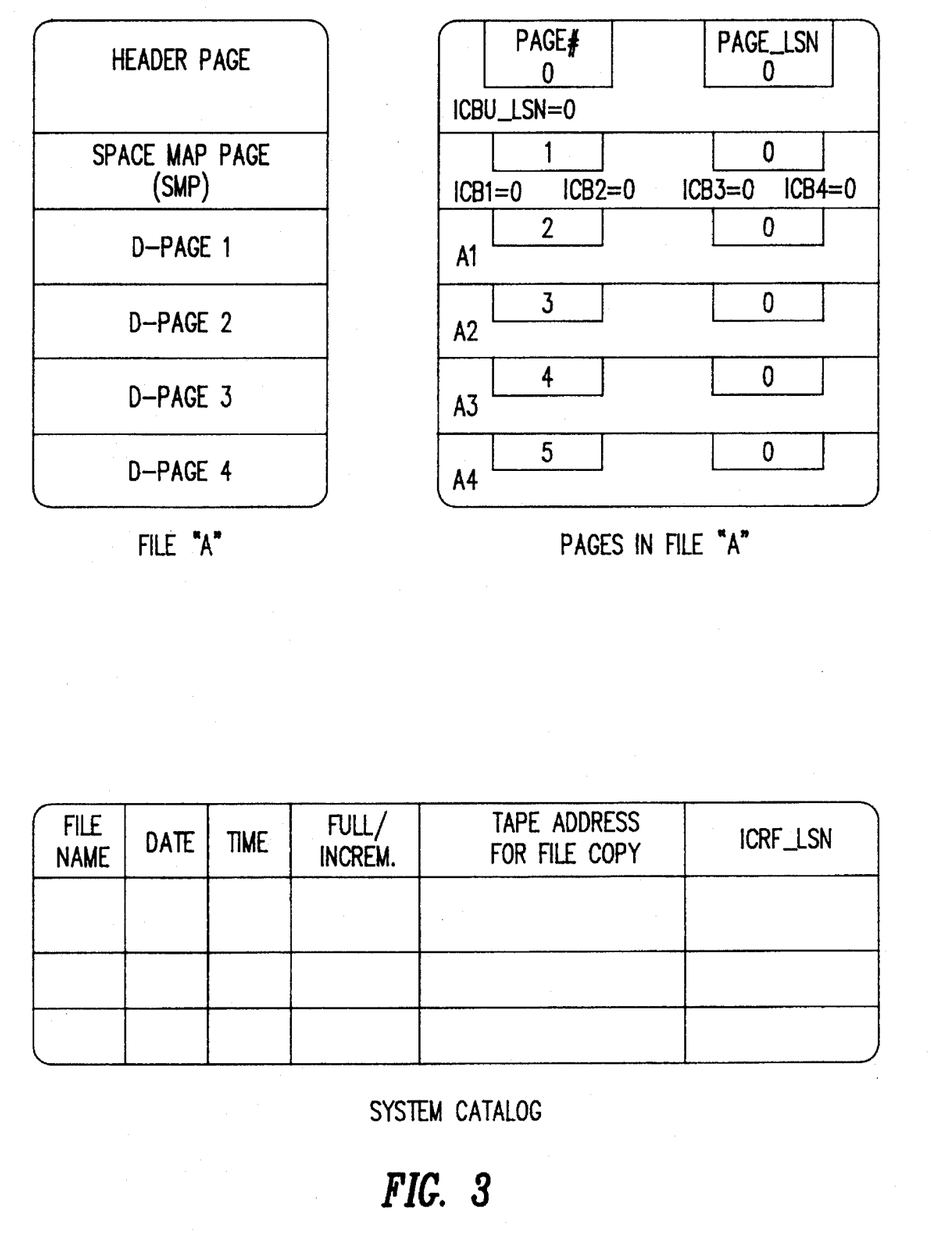
FIG. 3 shows a logical organization of a small file representing a database and a system catalog populated with assorted system constructs and data pages.

Referring now to FIG. 3, there is shown a logical file and page organization as used in the invention. More particularly, a file or data base includes a header page, a space map page (SMP), and a plurality of data pages (d-pages 1–4). The data, arbitrarily named "file A", is loaded into the database 13 in the DASD external storage under control of a CPU controlled load operation. To save log space and logging overhead, such loading is performed with the logging suspended. Also, no concurrent updates are permitted during execution of the loading operation. As part of the operation, page numbers are sequentially assigned to each page. The header page is number page 0, the SMP is page 1, while d-page 1–4 are numbered as pages 2–5. Now, the page numbers merely define a local page sequence and should NOT be confused with the page_LSN's. The latter are pointers embedded in each page when written through to DASD storage after being logged which denote the position of the REDO/UNDO records in the log containing the most recent page modification. Initially, the page_LSN's are set to 0. Likewise, the ICB's in the SMP for all the d-pages are set to 0 as is the ICBU_LSN in the header page. Lastly, since no backup exists for file A, there is no entry in the system catalog.

As seen in FIG. 3, the system catalog broadly contains a location pointer and other archive or backup copy information for an either a full or incremental copy of file A and other files. Typically, such archive copies would be stored on an auxiliary store such as an automated tape library. Any recovery use of the backup copy would require access of the tape library and staging therefrom to DASD storage.

Figure 4:
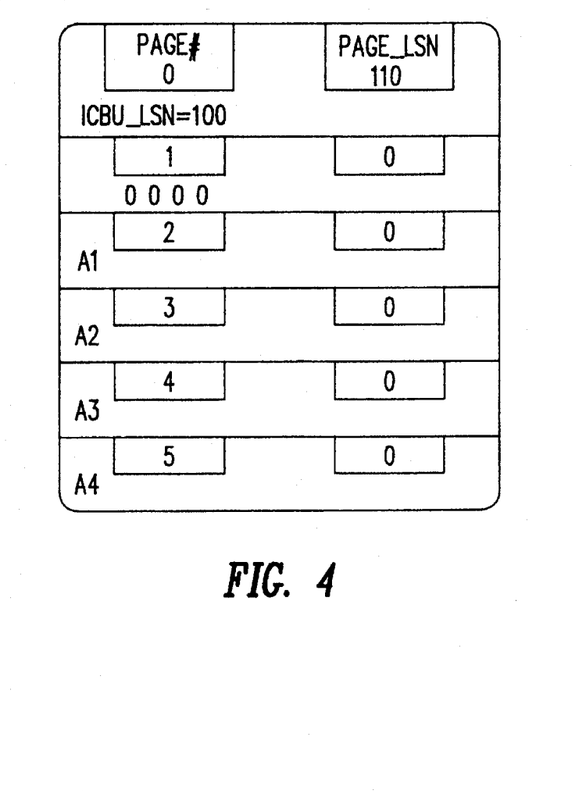
FIG. 4 depicts the file after initially loading data and taking a required full copy thereof under the assumption that logging was suspended for the duration of initial loading of the database.

Referring now to FIG. 4, there is shown the state of file A and the system catalog after a Full copy (FC) has been taken of file A subsequent to initial loading and prior to any modifications being permitted to the data pages. Note, in FIG. 4, the ICBU_LSN and the ICRF_LSN have been set to 100 since that was the current end_of_log after the completion of the FC. The header page is subsequently updated by the method to record this value of the ICBU_LSN by writing a log record having the LSN of 110. That is, the location in the log where the header page stores the current ICBU_LSN value of 100 is log location 110.

Figure 5:
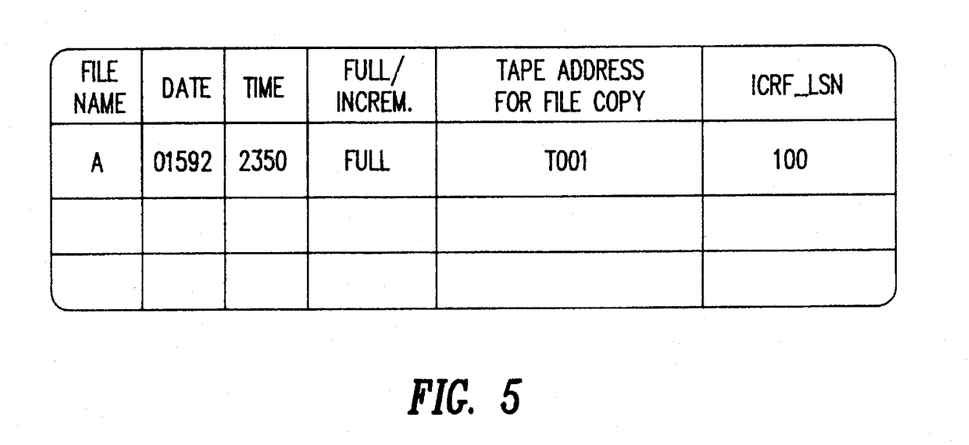
FIG. 5 sets forth the system catalog entry for the full backup.

Referring now to FIG. 5, there is shown the system catalog entry wherein the FC of file A was taken at 23:50 on Jan. 5, 1992 and stored in the tape library address T001. In case of a loss of DASD D001 (not shown) after the FC has been taken, then the DBMS recovery operation for file A would include the steps of:

(a) ascertaining the current end of log (arbitrarily termed END_LSN) and the tape location for the most recent full copy of file A from the system catalog;

(b) loading the FC backup of file A from tape location T001 to a DASD D002 (not shown);

(c) ascertaining any incremental copies (IICs) to file A subsequent to the FC from the system catalog and update accordingly (In the instant case for step (c), no IICs were as yet taken subsequent to the FC for file A);

(d) positioning the system log at the ICRF_LSN=100 since that is the most recent backup and applying log records for updates of the pages of file A on DASD0002 if the page_LSN< LSN of the log record (In the posited instance, this would be from the ICRF_LSN=100 to END_LSN).

In order to reduce the number of log scans during step (d), the DBMS could utilize another directory located in a modified systems catalog. This other directory preferably would consist of log ranges during which file A was opened for update. This directory labeled "SYSLGRNG" (not shown) for the instant example would have an entry for file A indicative of LSNs from 100 to 110 for the header page update. The recovery operation would then be complete.

Referring now to FIGS. 6A–6E, there are set forth modifications to selected data pages (pages 1 and 3) by transactions. It should be recalled that header page has the ICBU_LSN=100, page_LSN of d-pages 1 and 3=0.

Figure 6A:
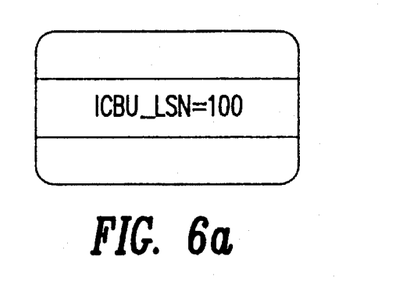
FIGS. 6A–6E illustrate transaction modifications to various data pages and the various SMP and LSN changes.
Figure 6B:
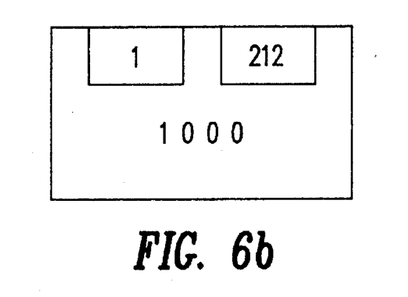
Figure 6C:
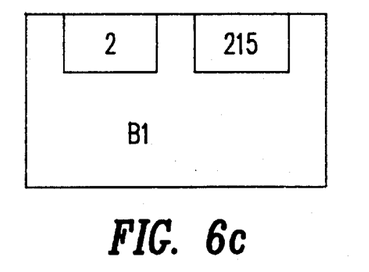

In the update of d-page 1, the ICBU_LSN=100 for file A is also recorded in the data base control block (DBCB) per FIG. 6A. Since the page_LSN of d-page 1 of 0<ICBU_LSN of 100, then the update method has to set the ICB1 in the SMP prior to updating d-page 1. Both the ICB1 change and the LSN where the change is recorded in the log (LSN212) are marked on the SMP as shown in FIG. 6B. Next, the value of d-page 1 is changed from A1 to B1 and log recorded at LSN 215. These changes are indicated in the updated d-page 1 in FIG. 6C.

Figure 6D:
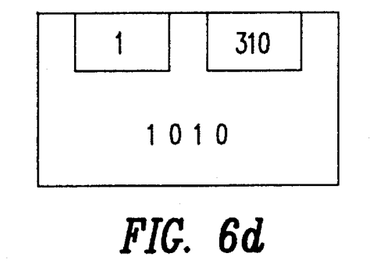
Figure 6E:
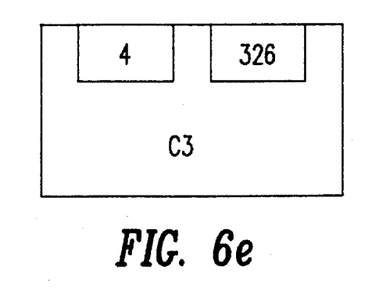

In the update of d-page 3, since the page_LSN of d-page 3 of 0< ICBU_LSN of 100, then the ICB3 in the SMP is set to 1 before update of d-page 3 as seen in FIG. 6D. Following this, d-page 3 is updated from value A3 to C3 and the LSN where this is logged at LSN 326 is also marked on d-page 3 per FIG. 6E.

Figures 7, 8A, 8B, 8C:
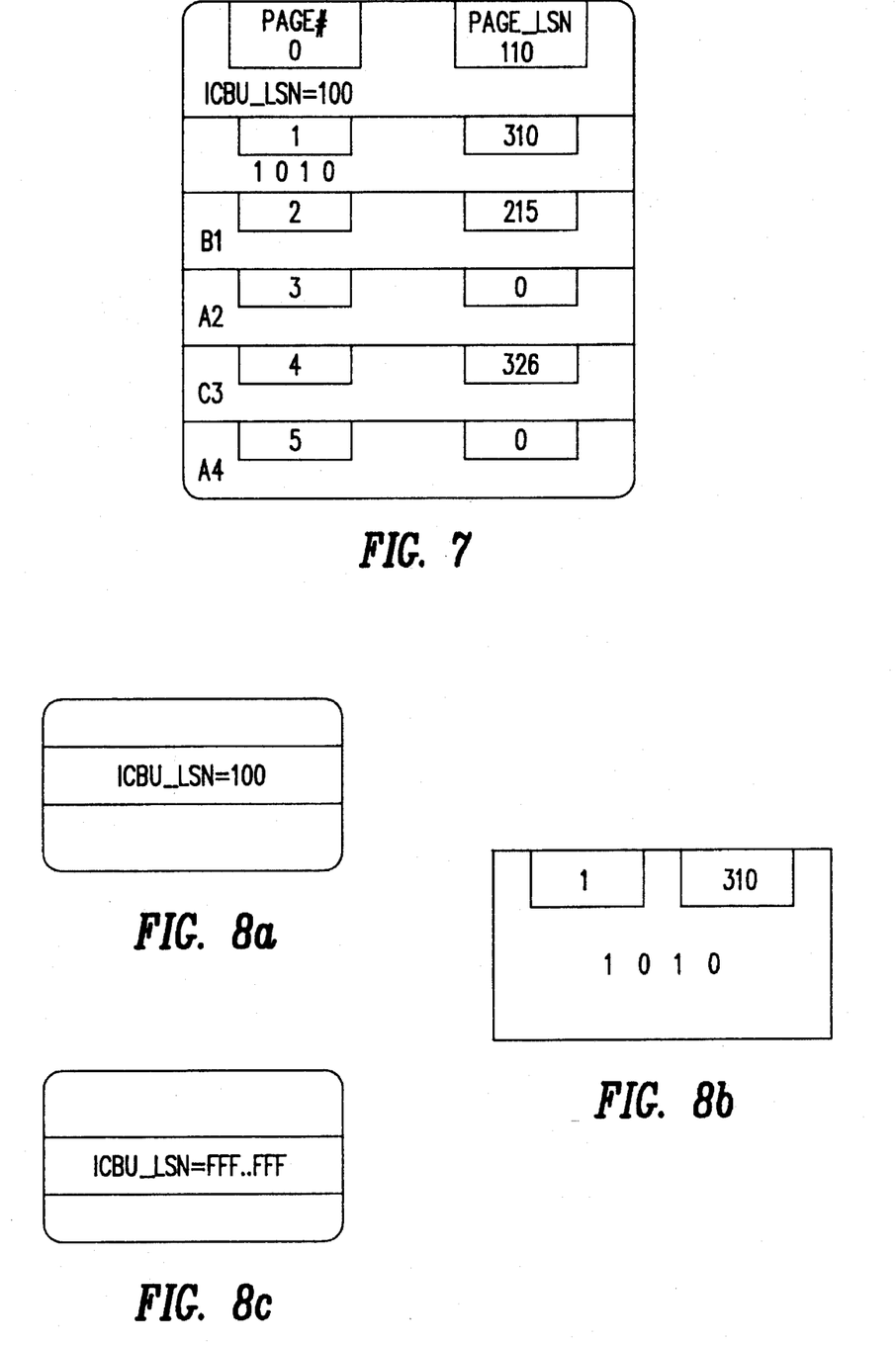
FIG. 7 shows the consolidated version of changes set out in FIGS. 6A–6E.
FIGS. 8A–8L depict state and page changes in connection with an incremental copy operation according to the invention.

Referring now to FIG. 7, there is set forth file A as updated and written to DASD including SMP and page update changes.

Referring now to FIGS. 8A–8K, there is set forth the IC for file A depicted in FIG. 7. FIGS. 8A and 8B signify the initial state of file A for the IC operation per the DBCB and the SMP. The first step is to read the SMP into the buffer pool. Next, the ICBU_LSN is changed to a maximum value "FFFF..FF" in hexidecimal notation as per FIG. 8C. Following this the ICRF_LSN is set to the current end_of_log=463. The system catalog is now updated as expressed in FIG. 8D with a new entry indicative that an IC is being taken, date-time, location of the IC in the tape, and the ICRF_LSN.

Figure 8D:
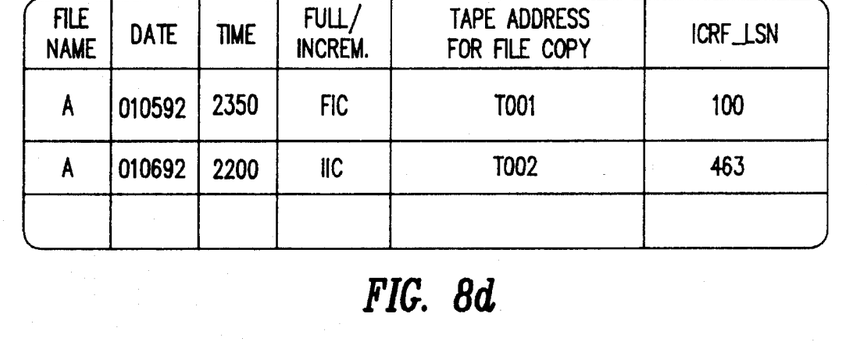
Figure 8E:
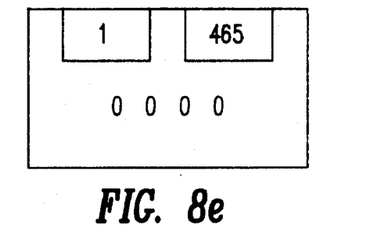
Figure 8F:
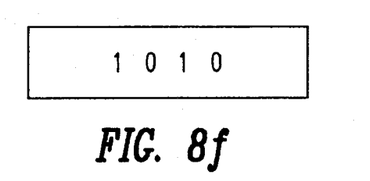

It is now desired to update the SMP in virtual storage. This means that it is necessary to latch the SMP and change it as shown in FIG. 8E. That is, after latching the SMP, those ICB's which are "1" are reset to "0" and a UNDO record as shown in FIG. 8F is written to the log after which the SMP is unlatched.

Figure 8G:
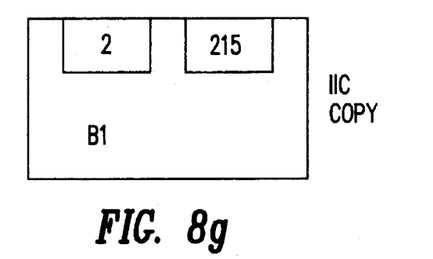

The IC copy operation involves replicating the header and SMP pages and the d-pages whose ICBs were reset from "1" to "0". Each page including the d-page are required to be latched, copied to the tape T002, and then unlatched. Each page on the tape is as pristine as that of d-page 1 per FIG. 8G. For purposes of completeness, IC causes a copy of d-page 3 to be made to tape T002 per FIG. 8J. The last step is that of obtaining the current end_of_log value for the ICBU_LSN and copying it to both the DBCB and an updated header page, logging it for the header page and placing the page LSN in the header page shown in FIGS. 8K and 8L.

Figure 8H:
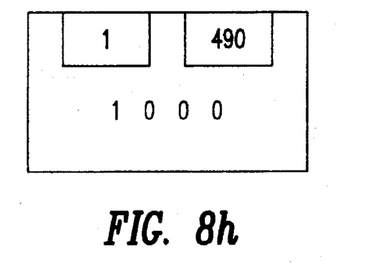
Figure 8I:
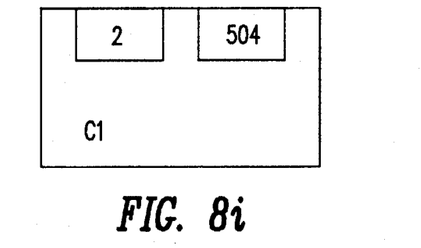
Figure 8J:
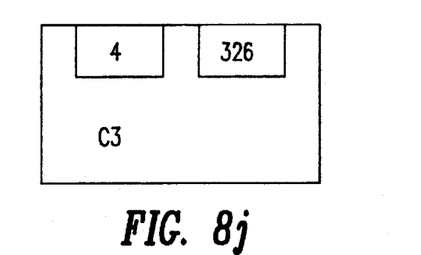
Figure 8K:
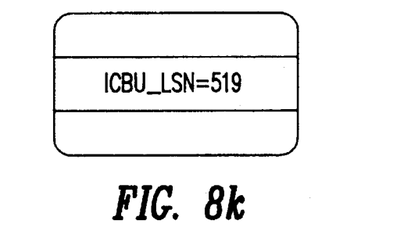
Figure 8L:
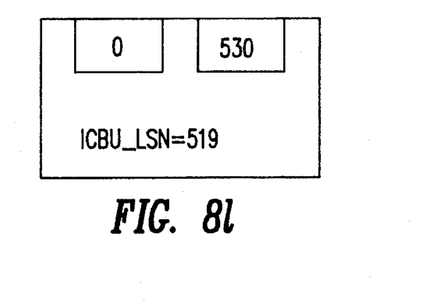

Referring yet again to FIG. 8A–8L, suppose, that another transaction seeks to update d-page 1 just AFTER it has been copied to tape T002 as shown in FIG. 8G. Recall, that all of the ICBs have been reset to "0" as part of the determination of the set of pages to be incrementally copied as in FIG. 8E. Thus, any current update to d-page 1 will require setting ICB1. Now, the page_LSN=215 for d-page 1. This is less than the ICBU_LSN set to MAX. Whence,.the ICB1 would be set to 1 in the SMP, d-page 1 updated, and both pages logged with the LSN's being recorded on the respective pages as shown in FIGS. 8H and 8I.

Significantly, if the ICBU_LSN value had remained at 100, then the update to d-page 1 would NOT have resulted in ICB1 being set to "1". Thus, subsequent IICs would not copy d-page 1 with the value "CI". Any completion of a subsequent IC would result in an ICRF_LSN>504. In the case of any loss of file A after the subsequent IC, the restoration of backup copies using an ICRF_LSN >504 would cause the update of LSN 504 to be missed. This explains the need for setting the ICBU_LSN to a maximum value DURING THE IC while a new non-maximum value is being established. Setting ICBU_LSN to a non-max value AFTER completing the IC including latching, copying, and unlatching all pages in the copy set is required, otherwise every update to any page in the file would cause access to the SMP for setting the corresponding ICB or checking whether the ICB is already set. The latter is considered wasteful.

In this example, d-page 3 has not been copied yet, therefore, the new non-max value for the ICBU_LSN not been established. The transaction which updated d-page 1 used the max value of the ICBU_LSN to compare its page LSN.

Other Factors in Setting a New Non-Max Value for the ICBU_LSN

There are other factors to take into account when setting a new non-max value for the ICBU_LSN. Now, it is required that there is no updating transaction which could have used the old ICBU_LSN value for comparison and therefor bypassed setting the ICB bit and its new page_LSN could be >ICBU_LSN. Such could occur if the update transaction is removed from the queued or scheduled activities by the operating system after the transaction has compared its page_LSN with the old value of the ICBU_LSN. This would lead to situation sought to be avoided by setting the ICBU to a maximum value during IC. That is, if the value were other than max, then a subsequent update to a page would not be captured by the next copy operation since its ICB was not set.

The solution requires shared or S latching the page. This guarantees that an updating transaction has completed the update to the page i.e. latching renders updating an atomic operation.

It should be noted that an S latch is required for making a consistent copy of the page.

Since only a single value of the ICBU_LSN is to be selected, such selection should occur only after S latching all of the pages in the copy set.

Figure 9A:
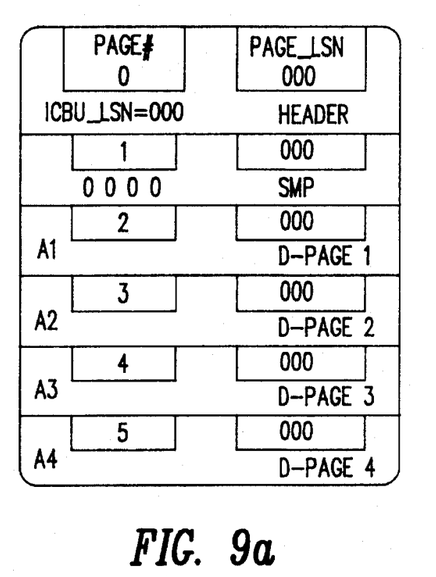
FIGS. 9A–9B show the copies of file A on tape storage after full and incremental copy operations are archived.
Figure 9B:
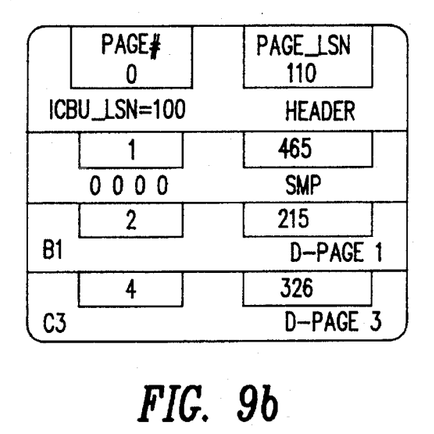

Referring now to FIGS. 9A–9B, there is shown the of file A after full and incremental copy operations as archived on tape storage. Suppose the DASDs storing the current copies failed such that it was necessary to recover the current state of file A. In this case, according to the system catalog as shown in FIG. 8D, the location of the most recent full copy and subsequent incremental copies is established and the ICRF_LSN=463. This means restoring file A based on merging the full and incremental copies by PAGE NUMBERS presently archived respectively at tape library addresses T001 and T002.

Figure 10A:
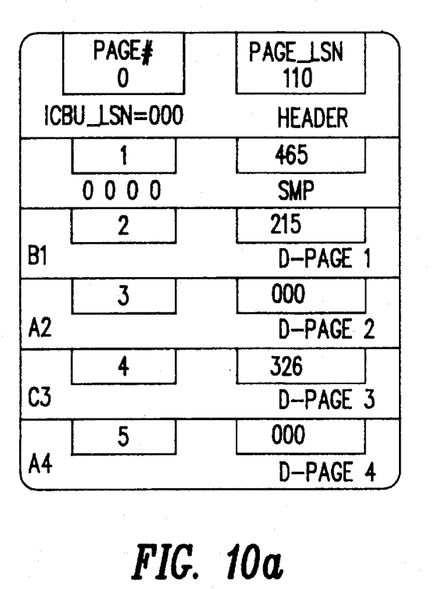
FIGS. 10A–10B depict file A after a recovery using the FC and IC of FIGS. 9A–9B and log records.
Figure 10B:
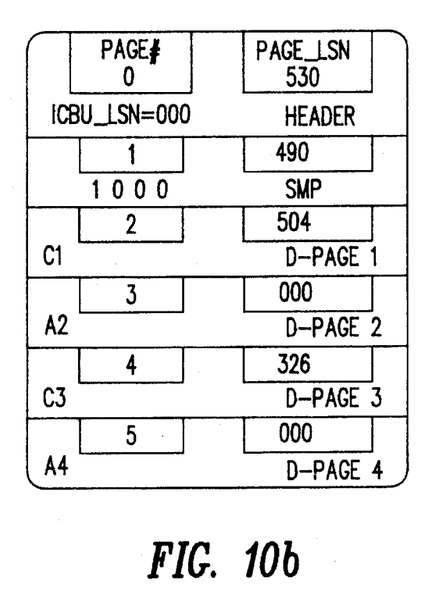

Referring now to FIG. 10A, there is shown the page merged copy of file A from the stored tapes. To bring the state of the page forward, the log would be scanned from LSN 463 and would apply the updates to the SMP at LSN 490, d-page 1 at LSN 504, header page at 530. This yields the final file state as shown in FIG. 10B.

Figure 11A:
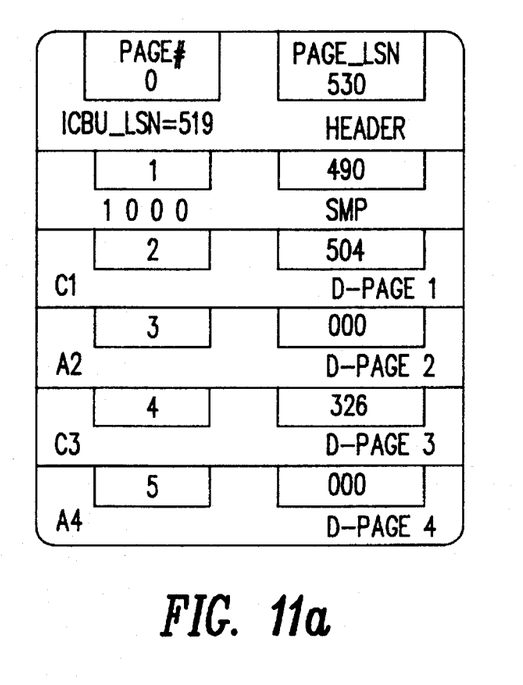
FIGS. 11A–11B illustrate the state of the file and constructs after multiple updates to at least one page.
Figure 11B:
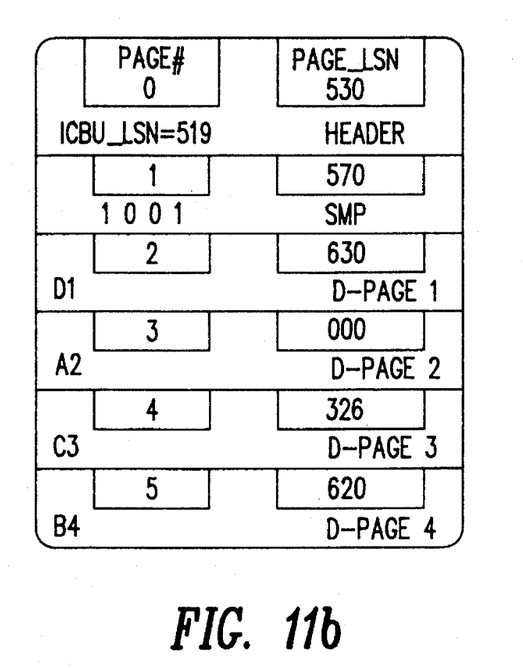

Referring now to FIGS. 11A–11B, there is shown the state of the file and constructs after multiple updates to at least one page. In this case, a transaction updates d-page 4 and then d-page 1.

For d-page 4, since the page_LSN (00 is less than the ICBU_LSN (519), then ICB4 would be set to 1 in the SMP, the SMP logged at page_LSN=570, and the d-page 4 updated to B4 and logged at page_LSN=620.

For d-page 1, since the page_LSN (504) is less than the ICBU_LSN (519), the SMP would be accessed but since ICB1 already is set to 1, then no update to the SMP is required. Next, d-page 1 is updated to value D1 and logged at page _LSN=630.

If an IC were now to be taken, the copyset according to the SMP would d-page 1 and 4.

These and other extensions of the invention may be made without departing from the spirit and scope thereof as recited in the appended claims.

We claim:

1. A method for archiving a file of modifiable pages in a phased commit transaction management system (TMS) having a log, a processor, and a storage subsystem in which pages stored therein are staged to and from the processor, said file having a header page, status page (SMP), and at least one data page, the processor being responsive to each transaction and executing selective modifications to predetermined ones of the pages, each modification to a page state being recorded in the log and assigned an ascending log sequence number (page_LSN), said page_LSN being recorded on the page, comprising the steps of:

(a) creating and maintaining a first global log sequence number (ICBU_LSN) on said header page and a plurality of status bits (ICB) on said SMP, each ICB being counterpart to each of the data pages and indicative of the page having been modified since an immediately prior archive or copy operation;

(b) setting the ICBU_LSN to a maximum value, and establishing a second global log sequence number (ICRF_LSN) and recording said ICRF_LSN in a system catalog;

(c) ascertaining a set of pages subject to archiving by scanning the ICBs in the SMP and resetting that subset of ICBs indicative of the pages having been modified since an immediately prior archive or copy operation;

(d) executing a copy operation by in turn latching, copying, and unlatching each page of said subset of ICBs scanned and reset in step (c) for incremental copying and for all pages irrespective of their ICB condition for full copying;

(e) setting the ICBU_LSN to the current end_of_log_LSN value and recording it in the header page; and (f) responsive to each page modification, setting the counterpart ICB in the SMP if the page_LSN<ICBU_LSN, and recording the action in the log with a REDO only log record.

2. The method according to claim 1, wherein each page in the file has recorded thereon an ascending page number independent of any other indicia, wherein said system catalog comprises entries recording information about each full or incremental copy of the file, each entry including a pointer to the location of each archive copy of the file in the storage subsytem and an ICRF_LSN set to the end_of_log_LSN as per claim 1, step (e), and wherein said method further comprises the steps of:

(g) making a full copy of each file each time the data is loaded into the file without logging, suspending any data page modifications until the full copy is made, and recording the pointer location, copy type (full) and ICRF_LSN in the system catalog;

(h) making incremental or full copies of each file on a scheduled or opportunistic basis including entries to the system catalog;

(i) responsive to the unavailability of a file in the external storage subsystem, recovering said file by merging according to their page numbers the contents of the full and incremental copies as defined by the system catalog, and modifying the merged page set according to the log records having an LSN equal to or greater than the ICRF_LSN.

3. The method according to claim 1, wherein actions recorded in the log include REDO/UNDO and REDO only log record types, any ICBU_LSN modification to the header page being recorded in the log via a REDO only log record.

4. The method according to claim 1, wherein said TMS maintains a list of pages already modified or in the process of being modified, the method steps being modified such they comprise:

(a') setting the ICBU_LSN to a maximum value and S latching each page in the modified list;

(b') setting the ICBU_LSN to a non-maximum value and, selecting a value for the ICRF_LSN;

(c') ascertaining a set of pages subject to archiving by scanning the ICB's in the SMP and resetting that subset otherwise set; and (d') executing a copy operation by in turn latching, copying, and unlatching each page of the subset scanned and reset in step (c) for incremental copying and for all pages irrespective of their ICB condition for full copying.

5. A method for archiving a database of modifiable pages in a phased commit transaction management system (TMS) having a log, a processor, and a storage subsystem in which pages stored therein are staged to and from the processor, the processor being responsive to each transaction and executing selective modifications to predetermined ones of the pages, each modification to a page state being recorded in the log and assigned an ascending log sequence number (page_LSN), said page_LSN being recorded on the page, comprising the steps of:

(a) initializing a copy operation for a partition of the database by
  (1) invoking a database control block (DBCB) for said partition, said partition having a header page, at least one data page, and at least one space map page (SMP) including a status bit (ICB) for each data page indicative as to whether the data page has been modified since execution of a prior copy operation,
  (2) atomically setting an LSN of a first kind (ICBU_LSN) to a maximum value in the DBCB, setting an LSN of a second kind (ICRF_LSN) to a value set by the current end_of_log LSN, and recording the ICRF_LSN in a system catalog, and
  (3) ascertaining the set of data page's subject to copying for each SMP by resetting all ICB's of data pages indicative of being updated since the last copy operation and recording all of the ICB's so reset in the log; and (b) executing said copy operation by
  (1) for each SMP, latching, copying, and unlatching each data page identified in step (a)(3), and
  (2) updating the ICBU_LSN in the DBCB and the header page to the current end_of_log LSN value,
  (3) committing the operation, and (c) responsive to each page modification, setting the counterpart ICB in the status page if the page_LSN<ICBU_LSN and record the action in the log.

6. A method for archiving a file of modifiable pages in a phased commit transaction management system (TMS) having a log, a processor, and a storage subsystem in which pages stored therein are staged to and from the processor, said file having a header page, status page (SMP), and at least one data page, each page in the file has recorded thereon an ascending page number independent of any other indicia, the processor being responsive to each transaction and executing selective modifications to predetermined ones of the pages, each modification to a page state being recorded in the log and assigned an ascending log sequence number (page_LSN), said page LSN being recorded on the page, comprising the steps of:

(a) creating and maintaining a first global log sequence number (ICBU_LSN) on said header page and a plurality of status bits (ICB) on said SMP, each ICB being counterpart to each of the data pages and indicative of having been modified since an immediately prior archive or copy operation;

(b) setting the ICBU_LSN to a maximum value, and establishing a second global log sequence number (ICRF_LSN) and recording said ICRF_LSN in a system catalog, said system catalog comprising entries recording information about each full or incremental copy of the file, each entry including a pointer to the location of each archive copy of the file in the storage subsystem and an ICRF_LSN set to an end_of_log_LSN, (c) ascertaining a set of pages subject to archiving by scanning the ICBs in the SMP and resetting that subset of ICBs indicative of the pages having been modified since an immediately prior archive or copy operation;

(d) executing a copy operation by in turn latching, copying, and unlatching each page of said subset of ICBs scanned and reset in step (c) for incremental copying and for all pages irrespective of their ICB condition for full copying;

(e) setting the ICBU_LSN to the current end_of_log_LSN value and recording it in the header page;

(f) responsive to each page modification, setting the counterpart ICB in the SMP if the page_LSN<ICBU_LSN, and recording the action in the log with a REDO only log record;

(g) making a full copy of each file each time the data is loaded into the file without logging, suspending any data page modifications until the full copy is made, and recording the pointer location, copy type (full) and ICRF_LSN in the system catalog;

(h) making incremental or full copies of each file on a scheduled or opportunistic basis including entries to the system catalog; and (i) responsive to the unavailability of a file in the external storage subsystem, recovering said file by merging according to their page numbers the contents of the full and incremental copies as defined by the system catalog, and modifying the merged page set according to the log records having an LSN equal to or greater than the ICRF_LSN.

* * * * *